(12) United States Patent
Blasco Allue et al.

(10) Patent No.: US 7,426,659 B2
(45) Date of Patent: Sep. 16, 2008

(54) FORCED DIAGNOSTIC ENTRY UPON POWER-UP

(75) Inventors: Conrado Blasco Allue, Austin, TX (US); Paul Kimelman, Alamo, CA (US); Andrew Brookfield Swaine, Cambridge (GB); Richard Roy Grisenthwaite, Cambridgeshire (GB)

(73) Assignee: ARM Limited, Cambridge (GB)

( * ) Notice: Subject to any disclaimer, the term of this patent is extended or adjusted under 35 U.S.C. 154(b) by 534 days.

(21) Appl. No.: 11/085,263

(22) Filed: Mar. 22, 2005

(65) Prior Publication Data

US 2005/0246585 A1 Nov. 3, 2005

Related U.S. Application Data

(63) Continuation-in-part of application No. 10/801,136, filed on Mar. 16, 2004, now abandoned.

(51) Int. Cl.
G06F 11/00 (2006.01)
(52) U.S. Cl. ........................................ 714/27
(58) Field of Classification Search ............ 714/13, 714/23–25, 27, 36
See application file for complete search history.

(56) References Cited

U.S. PATENT DOCUMENTS

| | | | |
|---|---|---|---|
| 5,568,607 A | 10/1996 | Ishikawa et al. | |
| 5,922,075 A | 7/1999 | Bowker | |
| 5,926,640 A * | 7/1999 | Mason et al. | 713/320 |
| 6,189,114 B1 | 2/2001 | Orr | |
| 6,430,727 B1 | 8/2002 | Warren | |
| 7,228,457 B2 * | 6/2007 | Allue et al. | 714/27 |
| 7,251,751 B2 * | 7/2007 | Blasco Allue et al. | 714/25 |
| 2005/0210328 A1 * | 9/2005 | Allue et al. | 714/25 |

* cited by examiner

Primary Examiner—Nadeem Iqbal
(74) Attorney, Agent, or Firm—Nixon & Vanderhye P.C.

(57) ABSTRACT

A data processing system 2 is described having a central processing unit 4 and a diagnostic mechanism 10. The central processing unit 4 is switchable into a power-down mode from which it may resume into a normal operation mode. When the central processing unit 4 resumes into the normal operation mode, execution of program instructions is inhibited by the diagnostic mechanism 10 to allow the diagnostic mechanism to be appropriately programmed such that the immediate power-up code and operations can be properly diagnosed. The requirement to prevent program instruction execution on power-up is programmed by writing to a latch 16 within the diagnostic mechanism 10 prior to the power-down. The prevention of program execution may be achieved, for example, by generation of a halt request or by extending the time period for which the central processing unit 4 is held in reset following power-up.

28 Claims, 4 Drawing Sheets

FORCED DIAGNOSTIC ENTRY UPON POWER-UP

This application is a continuation-in-part of U.S. Ser. No. 10/801,136, filed 16 Mar. 2004 now abandoned. The entire contents of this application is incorporated herein by reference.

BACKGROUND OF THE INVENTION

1. Field of the Invention

This invention relates to the field of data processing systems. More particularly, this invention relates to diagnostic mechanisms within data processing systems which are dynamically switchable between an operational mode and a powered down mode.

2. Description of the Prior Art

It is known to provide data processing systems with diagnostic mechanisms which can be used to perform diagnostic operations (e.g. software and hardware fault identification and analysis (debug)) upon the data processing systems so as to assist in the development of hardware, operating systems, application programs, overall system designs and the like. As data processing systems become more complex and include larger numbers of elements operable in more diverse ways, the need for comprehensive diagnostic tools able to perform diagnostic operations upon the systems in a wide variety of states and configurations becomes more important.

Another development within data processing systems aimed at reducing power consumption, so as, for example, to improve battery life, is the use of dynamic switching between operational and powered down modes. As an example, within an integrated circuit different portions, such as different processor cores, may be selectively powered up and powered down as the demand for the processing operations they can perform varies with the user's requirements.

In order for diagnostic operations to be as accurate as possible it is important that the system behavior they are attempting to investigate should be perturbed as little as possible by the investigation itself. In this context, when seeking to obtain diagnostic information concerning power-up and power-down behavior it is desirable that the circuits concerned should actually power-up and power-down rather than this merely being simulated. However, a problem arises in that diagnostic circuitry embedded within the data processing circuits being powered up and powered down will lose its configuration and so be unable to continue the diagnostic operation after the system is powered down. Continuously powering the diagnostic elements within the circuit portion being powered down is undesirable since it requires a non-contiguous power domain.

SUMMARY OF THE INVENTION

Viewed from one aspect the present invention provides apparatus for processing data, said apparatus comprising:

a data processing circuit operable to execute program instructions to perform data processing operations during an operational mode, said data processing circuit being dynamically switchable between said operational mode and a powered down mode; and a diagnostic circuit operable to perform diagnostic operations upon said data processing circuit;

wherein when said data processing circuit returns to said operational mode from said powered down mode and any required processing operations have been completed, said diagnostic circuit prevents execution of further program instructions until released by said diagnostic circuit.

The present technique recognizes that an important area of behavior to be subject to diagnostic operations is that immediately following return to an operational mode from a powered down mode. The difference in processing speed between the circuitry under investigation and typical diagnostic circuitry means that the typical diagnostic circuitry is not sufficient fast to be able to observe the immediate power-up behavior without modification. The present technique proposes that the diagnostic circuitry should provide a mechanism whereby it automatically serves to prevent execution of program instructions (once any necessary program instructions or other operations have executed) upon power-up such that the diagnostic circuitry can be arranged and configured to monitor the power-up operations as desired.

It will be appreciated that in some embodiments program instruction execution can be prevented immediately power-up occurs with no program instructions being executed until released to do so by the diagnostic circuitry. Alternatively, in other embodiments, for example, overriding security considerations (e.g. a system which boots into a secure mode of operation and does not permit diagnosis during such a secure mode of operation) may necessitate at least some processing operations (e.g. changing to a non-secure mode of operation) to be performed prior to program instruction execution being prevented to allow the diagnostic system to be configured. Another example of processing operations which may be desired to be performed prior to program instruction execution being prevented is the restoration of state by the operating system following a power-down prior to diagnosis of the start up of an application program executing on that operating system layer. In this context, the operating system may be allowed to complete the restoration operation with the application program then being prevented from being executed by the diagnostic circuitry.

There are a number of ways in which the diagnostic circuitry can prevent execution of program instructions upon power-up. In one preferred technique the diagnostic circuitry generates a halt request which halts the data processing instruction execution. In another technique, the diagnostic circuitry may hold the data processing circuit in a reset state whereby program execution is prevented until release from that reset set is permitted.

Whilst it is possible that the diagnostic circuitry could be configured to always have the behavior of preventing program execution following power-up until a release is made, in preferred embodiments the diagnostic circuitry is configured by a diagnostic operation (which could be a bus signal, a diagnostic command, a diagnostic program instruction or other forms) such that it will give the above described behavior upon the next return to the powered up mode from the powered down mode.

In preferred embodiments the present technique may also be used to prevent program instruction execution following a warm reset during which the data processing circuit remains in the operational mode.

Another preferred embodiment is one in which following a reset an instruction fetch unit within the data processing circuit is prevented from fetching program instructions from the reset vector location into the instruction pipeline until it is released by the diagnostic circuit.

Viewed from another aspect the present invention provides a method of processing data, said method comprising the steps of:

executing program instructions with a data processing circuit to perform data processing operations during an operational mode, said data processing circuit being dynamically switchable between said operational mode and a powered down mode; and performing diagnostic operations upon said data processing circuit with a diagnostic circuit;

wherein when said data processing circuit returns to said operational mode from said powered down mode and any required processing operations have been completed, said diagnostic circuit prevents execution of further program instructions until released by said diagnostic circuit.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
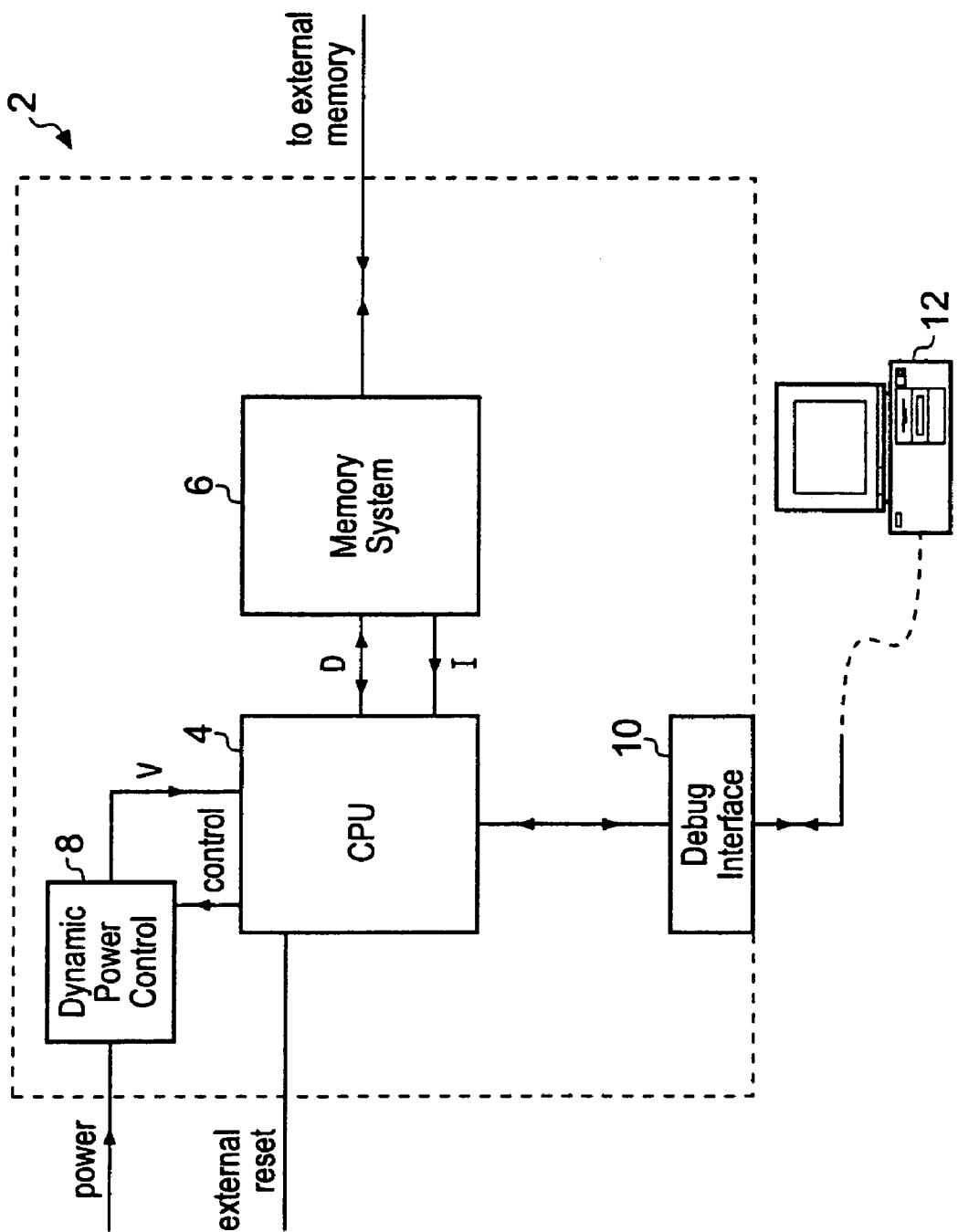
FIG. 1 schematically illustrates an integrated circuit including a diagnostic mechanism and operable to support dynamic power switching.

FIG. 1 illustrates an integrated circuit 2 including a central processing unit 4 operable to perform data processing operations under control of program instructions. A memory system 6 supplies data operands and program instructions to the central processing unit 4. A dynamic power controller 8 is responsive to control signals generated by the central processing unit 4 to switch the central processing unit from an operational mode into a powered-down mode as demand requires.

A diagnostic interface 10 is coupled to an external diagnostic system 12 (e.g. a suitably programmed general purpose computer) to perform diagnostic diagnostic operations upon the central processing unit 4. The diagnostic interface circuit 10 can respond to the external diagnostic system 12 to program diagnostic configuration data, such as breakpoints, watch points and diagnostic configuration parameters, to be stored within registers of the diagnostic interface circuit 10 itself or diagnostic registers embedded within the central processing unit 4.

Figure 2:
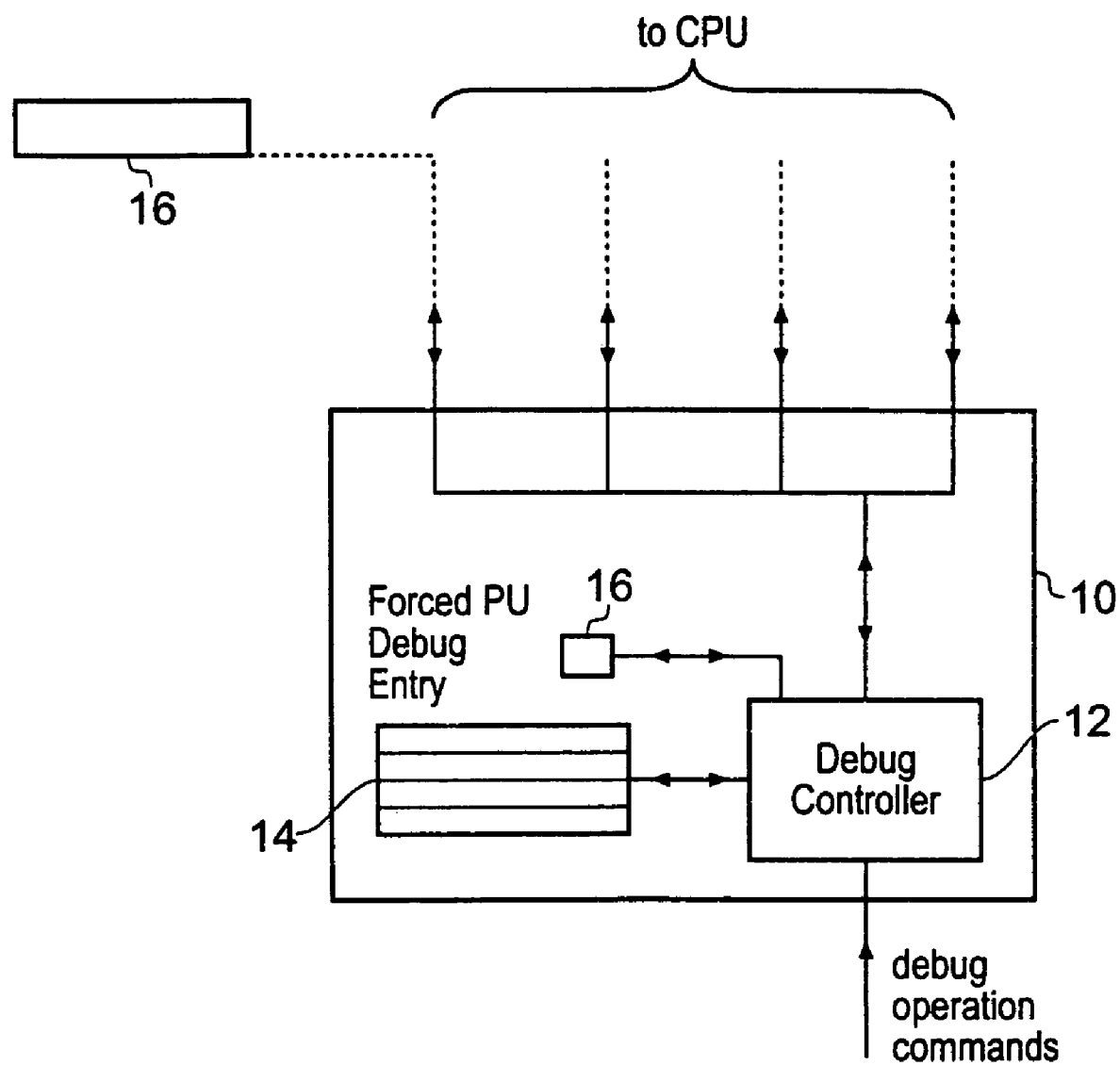
FIG. 2 schematically illustrates a diagnostic interface circuit in more detail.

FIG. 2 schematically illustrates the diagnostic interface circuit 10 in more detail. A diagnostic controller 12 is responsive to diagnostic operation commands (e.g. signals upon a dedicated diagnostic peripheral bus, diagnostic program commands and the like to perform requested diagnostic operations). Diagnostic configuration registers 14 within the diagnostic interface circuit 10 store diagnostic configuration parameters. Registers 16 within the central processing unit 4 itself also store diagnostic configuration parameters, such as breakpoints and watchpoint data. These registers 16 are programmed via the diagnostic interface circuit 10 and lose their data when the central processing unit 4 is powered down by the dynamic power controller 8. Accordingly, if the immediate startup of the central processing unit 4 after power-up is to be subject to diagnostic operations, then the diagnostic interface circuit 10 and the register 16 within the central processing unit 4 need to be appropriately reprogrammed prior to the central processing unit 4 being allowed to start to execute the program instructions intended to follow the power-up.

Also shown within FIG. 2 is a forced power-up diagnostic entry latch 16 which may be programmed by the diagnostic controller 12 to store a value indicating that when the next power-up occurs the diagnostic interface circuit 10 should prevent execution of program instructions by the processor core 4, other than those required (e.g. such as to switch out of a boot within a secure mode or to restore registers under operating system control for diagnosis of an application program) prior to diagnosis being performed upon the power-up code sequences and operation. The latch 16 may be considered as a flip-flop, a one bit register, a latch or other data storage element.

Figure 3:
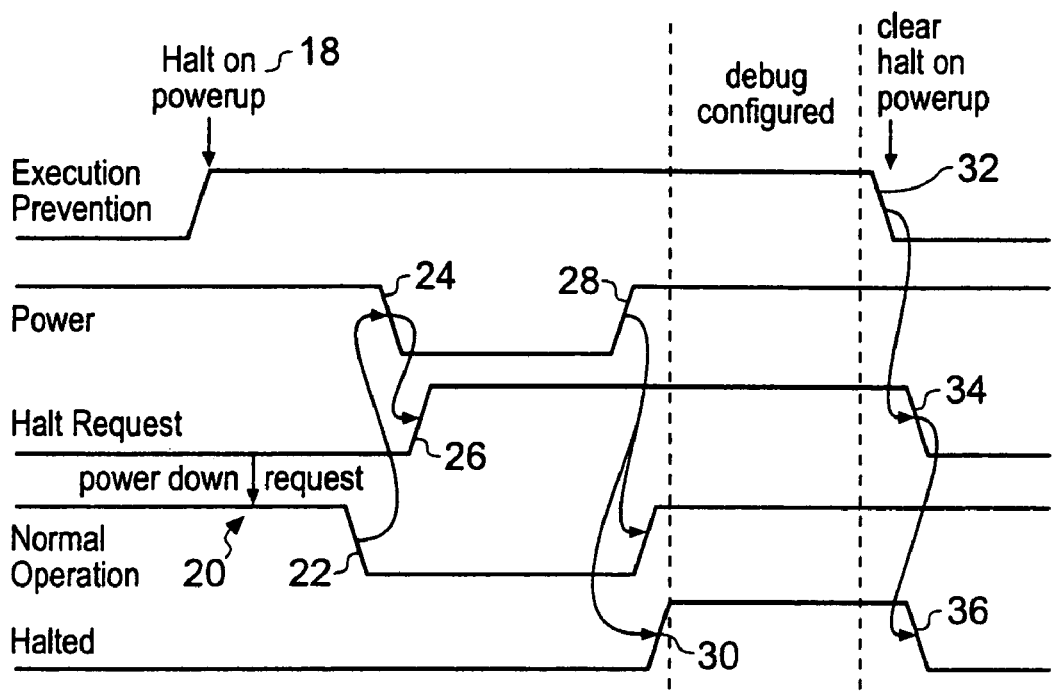
FIG. 3 is a signal timing diagram illustrating diagnostic forced entry using a halting mechanism upon power-up.

FIG. 3 is a timing diagram illustrating a first example of how the system of FIGS. 1 and 2 may operate. In this example a halt upon power-up is forced. At point 18 a diagnostic operation command received by the diagnostic controller 12 serves to set the force power-up diagnostic entry latch 16 to trigger forced diagnostic entry upon the next power-up event. At point 20 the central processing unit 4 is performing normal processing operation and a power-down request is generated, such as a request from the operating system which has detected that the processing load is low and there is no requirement for the central processing unit 4 to continue to operate and consume power. At time 22 following a power-down request at time 20, normal operation ceases and power-down is triggered at point 24, which in turn triggers generation of a pending halt request at point 26 that is maintained throughout the power-down period. At time 28, the system emerges from power-down, for example due to a wake on interrupt arrangement, a watchdog or some other mechanism. Following the power-up at time 28, normal operation is resumed but the pending halt request serves to halt the normal operation as indicated at time 30. This allows the external diagnostic system 12 to reprogram the diagnostic configuration required to diagnose the power-up code sequences and operations. At time 32, the diagnostic programming has completed and the halt on power-up signal stored within the latch 16 can be cleared thereby releasing the halt request at time 34 which in turn allows the halting of program instruction execution to be cancelled at time 36 and normal operation with normal program execution to be resumed.

Figure 4:
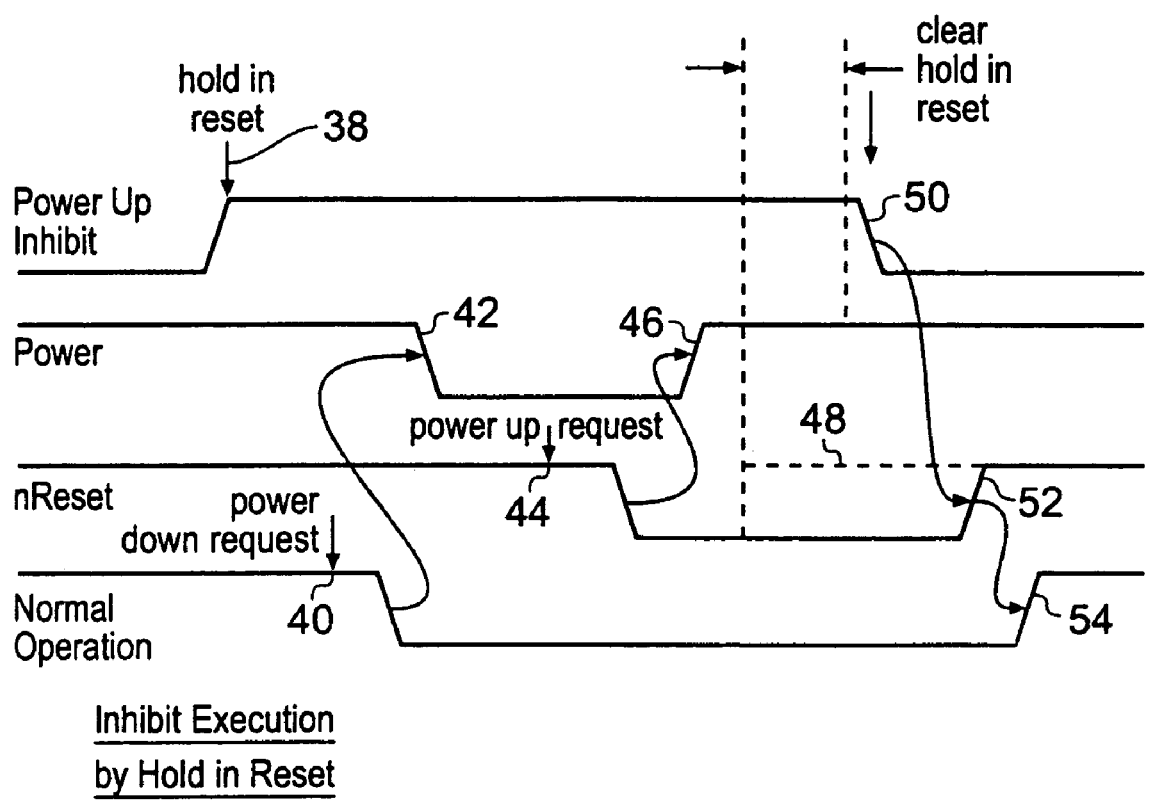
FIG. 4 is a timing diagram illustrating a diagnostic forced entry using an extended reset signal.

FIG. 4 illustrates an alternative operating mechanism using an extended reset. In this example, the latch 16 being set at time 38 is used to indicate that the system should be held in reset following a power-up event. Accordingly, when a power-down request at time 40 is subsequently followed by the power being removed from the central processing unit 4 at time 42, then this holding reset upon power-up requirement is still stored within the diagnostic interface circuit 10. When a subsequent power-up request occurs at time 44, the system forces a reset signal to be generated in the normal way such that the central processing unit 4 is held in reset whilst the power is actually restored at time 46. As indicated by the dotted line 48, the reset signal would normally be removed once the power signal has been safely restored and program instruction execution allowed to restart. However, the diagnostic interface circuit 10 under control of the hold in reset signal marker stored within the latch 16 serves to extend the reset period until this marker is cleared at time 50. This extended time allows the diagnostic mechanisms to be appropriately programmed to retrieve the desired diagnostic information from the power-up code sequences and operations. When the hold in reset flag is cleared this triggers the reset signal to be removed at time 52 and normal operation resumed at time 54.

Figure 5:
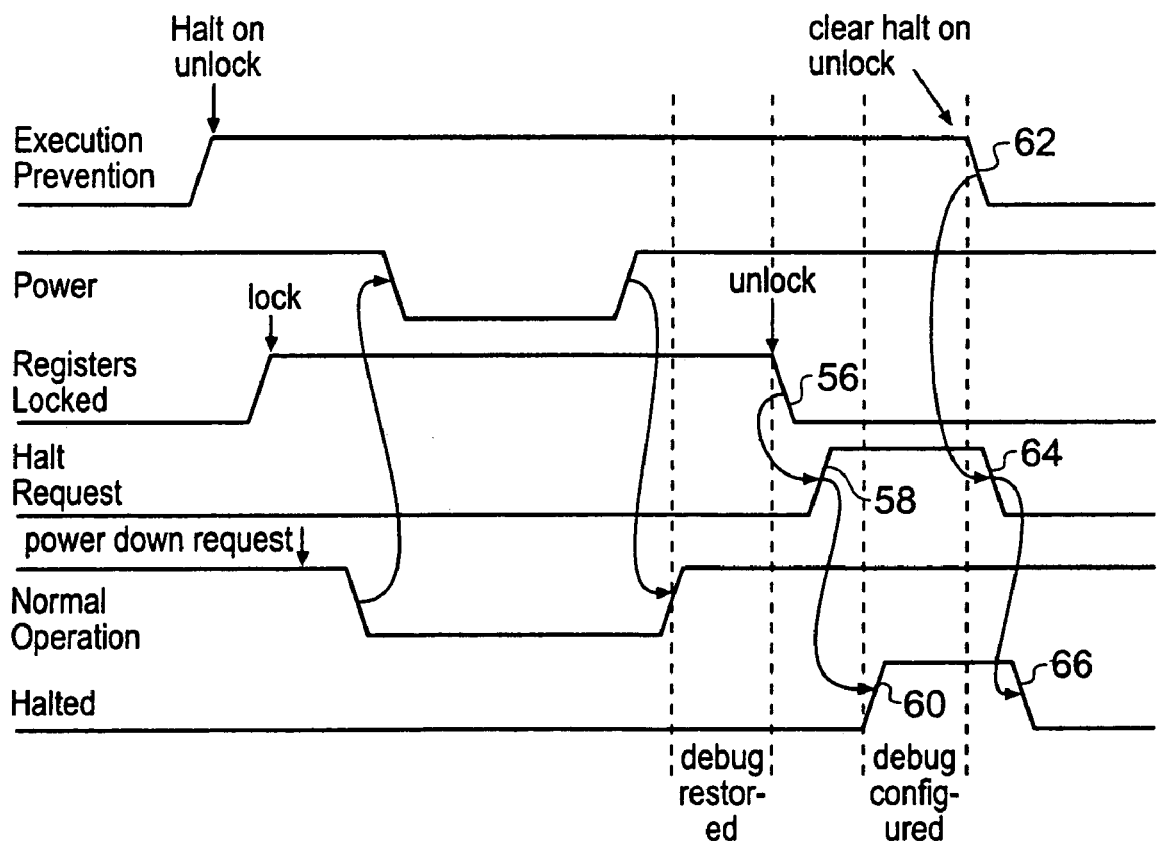
FIG. 5 is a diagram illustrating a diagnostic forced entry after register unlocking.

FIG. 5 schematically illustrates a further example embodiment. This example is similar to that of FIG. 3 except that the signal stored within the latch 16 indicates that the central processing unit 4 should be halted once a register lock which has been placed by the operating system upon registers to be saved and restored across the power-down has been removed at time 56. This register locking and unlocking is performed under operating system control and helps to ensure that race conditions do not occur between the diagnostic mechanisms attempting to read or write these registers and the operating system saving and restoring these registers. Once the registers have been unlocked following the power-up, a halt request signal is generated at time 58 and this serves to halt the processing at time 60 despite the central processing unit being back in the normal operation state to allow the debug register to be configured. When the halt on unlock signal is cleared at time 62 under diagnostic operation command control, the halt request is then cleared at time 64 and the the halting of the central processing unit 4 is removed at time 66.

In another embodiment, when the system emerges from a reset (which places the data processing circuit into a predetermined state), instead of holding the system in reset until released by the diagnostic circuit (see FIG. 4), an instruction fetch unit may simply be prevented from fetching new instructions (starting from the reset vector) to an instruction pipeline for execution. When the diagnostic circuit has completed any required setup, or other actions, then it releases the instruction fetch unit to start fetching instructions to the instruction pipeline (which then leaves its idle state).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a data processing circuit operable to execute program instructions to perform data processing operations during an operational mode, said data processing circuit being dynamically switchable between said operational mode and a powered down mode; and
   a diagnostic circuit operable to perform diagnostic operations upon said data processing circuit;
   wherein when said data processing circuit returns to said operational mode from said powered down mode and any required processing operations have been completed, said diagnostic circuit prevents execution of further program instructions until released by said diagnostic circuit.

2. Apparatus as claimed in claim 1, wherein when said data processing circuit returns to said operational mode from said powered down mode and any required processing operations have been completed and execution of further program instruction has been prevented, said diagnostic circuit forces diagnostic processing to be commenced.

3. Apparatus as claimed in claim 2, wherein when executing within a mode in which diagnostic processing is not permitted, said diagnostic circuit forces diagnostic processing to be commenced at a next permitted point.

4. Apparatus as claimed in claim 3, wherein said mode does not permit program execution to be halted.

5. Apparatus as claimed in claim 1, wherein upon return to said operational mode from said powered down mode by said data processing circuit said diagnostic circuit holds said data processing circuit in a reset condition until a subsequent diagnostic operation releases said reset condition.

6. Apparatus as claimed in claim 5, wherein said diagnostic circuit responsive to a diagnostic operation to force diagnostic processing when said reset condition is released.

7. Apparatus as claimed in claim 6, wherein said forcing of diagnostic processing includes halting program instruction execution.

8. Apparatus as claimed in claim 1, wherein
   upon return to said operational mode from said powered down mode by said data processing circuit said data processing circuit is operable to prevent access by said diagnostic circuit to one or more registers within said data processing circuit until after a restore operation restoring data values to said registers; and
   said diagnostic circuit is responsive to completion of said restore operation to force diagnostic processing to be commenced.

9. Apparatus as claimed in claim 1, wherein whilst execution is prevented, said diagnostic circuit is responsive to one or more diagnostic operation commands to setup a diagnostic circuit configuration to investigate return of said data processing circuit to said operational mode when released by said diagnostic circuit.

10. Apparatus as claimed in claim 1, wherein said diagnostic circuit is responsive to a diagnostic operation signal to program said diagnostic circuit to prevent execution of further program instructions until released by said diagnostic circuit upon a next return to said operational mode from said powered down mode by said data processing circuit.

11. Apparatus as claimed in claim 1, wherein said diagnostic circuit is also operable to prevent said data processing circuit executing predetermined program instructions until released by said diagnostic circuit upon release of a reset condition occurring whilst said data processing circuit remains in said operational mode.

12. Apparatus as claimed in claim 1, wherein upon return to said operational mode from said powered down mode by said data processing circuit, said diagnostic circuits prevents fetching of program instructions by an instruction fetch unit of said data processing circuit until released by said diagnostic circuit.

13. Apparatus as claimed in claim 12, wherein said return to said operational state includes resetting said data processing circuit to a predetermined state followed by fetching and execution of program instructions stored as a sequence starting at a reset vector address.

14. Apparatus as claimed in claim 12, wherein said instruction fetch unit supplies fetched program instructions to an instruction pipeline and said instruction pipeline remains idle until said instruction fetch unit is released by said diagnostic circuit.

15. A method of processing data, said method comprising the steps of:
   executing program instructions with a data processing circuit to perform data processing operations during an operational mode, said data processing circuit being dynamically switchable between said operational mode and a powered down mode; and
   performing diagnostic operations upon said data processing circuit with a diagnostic circuit;
   wherein when said data processing circuit returns to said operational mode from said powered down mode and any required processing operations have been completed, said diagnostic circuit prevents execution of further program instructions until released by said diagnostic circuit.

16. A method as claimed in claim 15, wherein when said data processing circuit returns to said operational mode from said powered down mode and any required processing operations have been completed and execution of further program instructions has been prevented, said diagnostic circuit forces diagnostic processing to be commenced.

17. A method as claimed in claim 16, wherein when executing within a mode in which diagnostic processing is not permitted, said diagnostic circuit forces diagnostic processing to be commenced at a next permitted point.

18. Apparatus as claimed in claim 17, wherein said mode does not permit program execution to be halted.

19. A method as claimed in claim 15, wherein upon return to said operational mode from said powered down mode by said data processing circuit said diagnostic circuit holds said data processing circuit in a reset condition until a subsequent diagnostic operation releases said reset condition.

20. A method as claimed in claim 19, wherein said diagnostic circuit responsive to a diagnostic operation to force diagnostic processing when said reset condition is released.

21. A method as claimed in claim 20, wherein said forcing of diagnostic processing includes halting program instruction execution.

22. A method as claimed in claim 15, wherein
upon return to said operational mode from said powered down mode by said data processing circuit said data processing circuit is operable to prevent access by said diagnostic circuit to one or more registers within said data processing circuit until after a restore operation restoring data values to said registers; and
said diagnostic circuit is responsive to completion of said restore operation to force diagnostic processing to be commenced.

23. A method as claimed in claim 15, wherein whilst execution is prevented, said diagnostic circuit is responsive to one or more diagnostic operation commands to setup a diagnostic circuit configuration to investigate return of said data processing circuit to said operational mode when released by said diagnostic circuit.

24. A method as claimed in claim 15, wherein said diagnostic circuit is responsive to a diagnostic operation signal to program said diagnostic circuit to prevent execution of further program instructions until released by said diagnostic circuit upon a next return to said operational mode from said powered down mode by said data processing circuit.

25. A method as claimed in claim 15, wherein said diagnostic circuit is also operable to prevent said data processing circuit executing predetermined program instructions until released by said diagnostic circuit upon release of a reset condition occurring whilst said data processing circuit remains in said operational mode.

26. A method as claimed in claim 15, wherein upon return to said operational mode from said powered down mode by said data processing circuit, said diagnostic circuits prevents fetching of program instructions by an instruction fetch unit of said data processing circuit until released by said diagnostic circuit.

27. A method as claimed in claim 26, wherein said return to said operational state includes resetting said data processing circuit to a predetermined state followed by fetching and execution of program instructions stored as a sequence starting at a reset vector address.

28. A method as claimed in claim 26, wherein said instruction fetch unit supplies fetched program instructions to an instruction pipeline and said instruction pipeline remains idle until said instruction fetch unit is released by said diagnostic circuit.

* * * * *